Aug. 10, 1926.
E. FARRELL
1,595,544
CLOTH EXPANDER
Filed Dec. 9, 1925
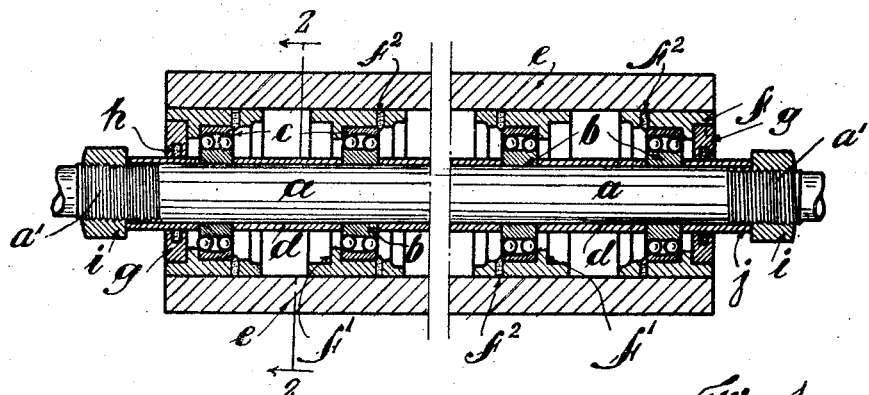
Fig. 1.
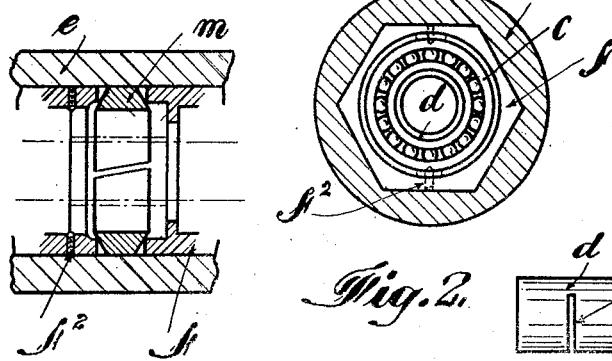
Fig. 4.
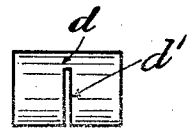
Fig. 3.
Fig. 2.
Fig. 6.
Inventor:-
Ernest Farrell.
By his Attorney, Walter Lunn Patented Aug. 10, 1926.

1,595,544

UNITED STATES PATENT OFFICE.

ERNEST FARRELL, OF SALFORD, MANCHESTER, ENGLAND.

CLOTH EXPANDER.

Application filed December 9, 1925, Serial No. 74,420, and in Great Britain October 29, 1924.

This invention relates to cloth expanders of the kind comprising a curved bar, a series of collars revoluble on said bar, and a rubber sleeve outside said collars, the collars serving to support the sleeve.

The present invention has for its object to provide improved means for rotatably supporting the rubber sleeve upon the curved bar whereby the sleeve will rotate with greater certainty and freedom relatively to the curved bar than when using the collars aforesaid.

According to the invention, a series of evenly spaced tubular metal bushes are employed, which correspond on their outer periphery to the interior shape and diameter of the rubber sleeve. Between each bush and the curved rod of the expander are ball (or roller) bearings preferably of the self-aligning type, the inner race rings fitting the rod and the outer race rings fitting against the inner faces of the bushes, these latter being each formed with a shoulder against which the race ring abuts at one end, and with a grub screw against which the other end of the race ring abuts. Between the inner race rings of the several pairs of inner and outer race rings, are spacing collars, which to allow of the curvature of the rod, are bevelled at each end. Each endmost spacing collar extends outside the expander and lies between the last inner race ring and a nut on a screwed part of the rod, so that by tightening up the nuts, the whole of the inner race rings and spacing collars are held firmly in position relatively to each other and to the rod, and outer race rings. The end bushes of the rubber sleeve are closed by a tightly fitting ring, which on its inner edge is grooved to hold a packing ring.

The said rubber sleeve bushes are preferably polygonal in shape on their exterior and the rubber sleeve is of corresponding shape on its interior, so that there shall be no relative angular movement between the bushes and sleeve when the expander is in use.

The invention will be further described with the aid of the accompanying drawings, whereon:—

Fig. 1 is a longitudinal section of a portion of one of the expanders, the section being taken in the plane of the expander.

Fig. 2 is a cross section of Fig. 1 on line 2, 2.

Fig. 3 is a face view of one of the spacing collars.

Fig. 4 illustrates a modification in sectional elevation.

Referring to Figs. 1 and 2, $a$ is the central curved rod, which is round in cross section from end to end. $e$ is the rubber sleeve and $f, f$ are the bushes for said sleeve, the outer shape of the bushes and the inner shape of the sleeve being such as to prevent relative rotation, and preferably hexagonal. $b$ and $c$ are the inner and outer race rings of the anti-friction bearings, each outer ring $c$ being positioned by the flange $f^1$ of the bush $f$ and by the point of a grub screw $f^2$. $d, j$ are the spacing collars, which closely fit the rod $a$, the collars $d$ lying between the inner race rings $b$ and the collars $j$ being at the ends of the rod $a$. A nut $i$ on a screwed part $a'$ near each end of the rod serves to clamp all the collars and inner race rings together and hold them in position on the rod $a$. As shown in Fig. 3 the collars may be slitted as at $d'$ to allow the ends to converge when tightened up. $g$ is the ring for closing in the end of the sleeve the ring tightly fitting into the end bush $f$, having a groove on its inner face fitted with a packing ring $h$, to make an oil and dust tight joint between itself and the collar $j$, while allowing free rotary movement of the bushes and sleeve around the rod.

In a modification, see Fig. 4, split rings $m$ are used between the outer bushes $f$, the ends of the rings being bevelled or made conical and contacting with the ends of the bushes, the purpose of the rings being to support the rubber sleeve at points intermediate of the bushes, while allowing for the changes of curvature of the sleeve as it revolves.

What I claim is:—

1. In a cloth expander, a curved rod of round cross section throughout and having a portion of its length screw-threaded near each end, a rubber sleeve encircling said rod and extending to points near each end of the rod, a series of evenly-spaced metal bushes within and fitting the interior face of the rubber sleeve, the exterior faces of the bushes and the interior face of the sleeve being other than circular, anti-friction bearings comprising inner and outer race rings with intermediate balls or rollers between each bush and the rod, spacing collars between the inner race ring of each bearing and the next, further collars on the rod and nuts screwing on to the screw-threaded portions of the rod and against said further collars, which lie between the nuts and the inner race rings of the endmost bearings, and means for supporting the expander at each end, as set forth.

2. In a cloth expander, a curved rod of round cross section throughout and having a portion of its length screw-threaded near each end, a rubber sleeve encircling said rod, and extending to points near each end of the rod, a series of evenly spaced metal bushes within and fitting the interior face of the rubber sleeve, the exterior faces of the bushes and the interior face of the sleeve being other than circular, anti-friction bearings comprising inner and outer race rings with intermediate balls or rollers between each bush and the rod, split and conical ended rings between the bushes and contacting therewith, spacing collars between the inner race ring of each bearing and the next, further collars on the rod and nuts screwing on to the screw-threaded portions of the rod and against said further collars, which lie between the nuts and the inner race rings of the endmost bearings, and means for supporting the expander at each end, as set forth.

3. In a cloth expander, a curved rod of round cross section throughout and having a portion of its length screw-threaded near each end, a rubber sleeve encircling said rod and extending to points near each end of the rod, a series of evenly-spaced metal bushes within and fitting the interior face of the rubber sleeve, the exterior faces of the bushes and the interior face of the sleeve being other than circular, self-aligning, anti-friction bearings comprising inner and outer race rings with intermediate balls between each bush and the rod, spacing collars between the inner race ring of each bearing and the next, further collars on the rod, and nuts screwing on to the screw-threaded portions of the rod and against said further collars, which lie between the nuts and the inner race rings of the endmost bearings, and means for supporting the expander at each end, as set forth.

In testimony whereof I have signed my name to this specification.

ERNEST FARRELL.